Figure 1:
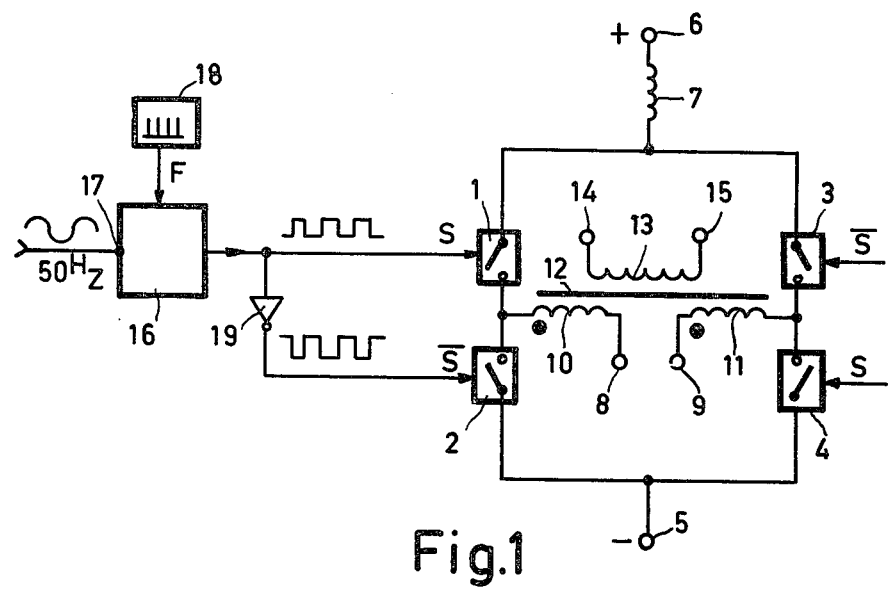

United States Patent [19]

Ferrieu

[11] 4,174,467
[45] Nov. 13, 1979

[54] RINGING SIGNAL GENERATOR FOR USE IN A SUBSCRIBER'S LINE CIRCUIT

[75] Inventor: Gilbert M. M. Ferrieu, Bievres, France

[73] Assignee: U.S. Philips Corporation, New York, N.Y.

[21] Appl. No.: 878,667

[22] Filed: Feb. 17, 1978

[30] Foreign Application Priority Data

Mar. 8, 1977 [FR] France .................................. 77 06756

[51] Int. Cl.² ............................................. H04M 3/04
[52] U.S. Cl. .............................. 179/18 HB; 179/84 R
[58] Field of Search ................. 179/84 R, 84 A, 17 E, 179/18 HB, 18 F, 18 FA

[56] References Cited

U.S. PATENT DOCUMENTS 3,723,662  3/1973  Macrander ...................... 179/18 HB Primary Examiner—Kathleen H. Claffy
Assistant Examiner—Joseph A. Popek
Attorney, Agent, or Firm—Thomas A. Briody; William J. Streeter; Simon L. Cohen

[57] ABSTRACT

A ringing signal generator for generating a ringing current in a subscriber's line uses a line current inverter controlled by means of a pulse code modulated signal obtained by encoding a sinusoidal ringing signal by means of a delta modulator at a sampling frequency which considerably exceeds the frequency of the ringing current.

4 Claims, 2 Drawing Figures

RINGING SIGNAL GENERATOR FOR USE IN A SUBSCRIBER'S LINE CIRCUIT

The invention relates to a ringing signal generator for use in a subscriber's connecting line, comprising a device provided with a control input for reversing the supply current in the subscriber's line.

It is known that subscriber's connecting circuits which enable the generation or detection of signals exchanged over a subscriber's loop (transmitting the ringing signal, direct current supply of the subscriber's line, reversing this direct current) are generally used in electronic switching and concentration apparatus in telephone exchanges.

The generation of the ringing signal (sinusoidal signal with a frequency of 50 Hz at an r.m.s. voltage of approximately 75 volts) often gives rise to problems for a practical implementation.

Reversing the line current is one technique used for generating ringing signals, having a frequency of 50 Hz. The reversal is accomplished by an inverter controlled by means of square-wave signals having said frequency of 50 Hz. The problem arises then that in the line all odd harmonics of the frequency of 50 Hz are produced with a high level, which can result in an impermissible crosstalk in the adjacent subscriber's line. In addition, the administrations impose relatively strict standards as regards the level of the harmonics of the ringing current and said standards exclude the practical applicability of said technique.

It is an object of the invention to generate ringing signals by means of a completely new manner of controlling the line current inverter with a very low level of disturbing harmonics.

In accordance with the invention the ringing signal generator is therefore characterized in that a signal convertor is provided with a pulse code generator for the generation of a pulse code signal obtained by coding a sinusoidal ringing signal in such a way that this pulse code signal can be demodulated by means of a filter comprising a series inductance and a parallel capacitance whereby said pulse code signal has a frequency which considerably exceeds the frequency of said ringing signal and is applied to said control input.

The invention will be further explained with reference to a drawing in which

Figure 2:
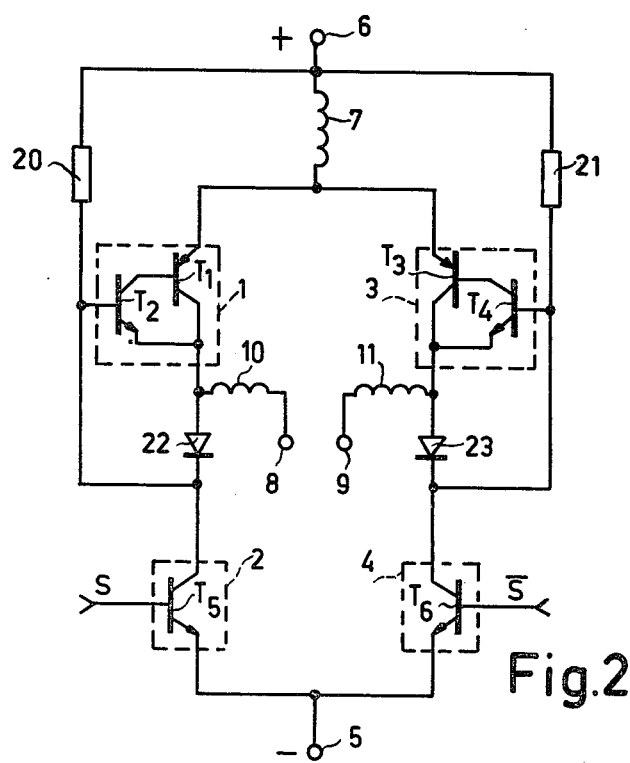

FIG. 1 shows a simplified diagram of an embodiment of the ringing signal generator, according to the invention, FIG. 2 shows a further circuit diagram of an embodiment of said ringing signal generator.

The generator according to the invention, shown in FIG. 1, comprises a device, for reversing the supply current in the subscriber's line, provided with a control input 24 and comprising four switches 1, 2, 3, 4. The series arrangements of the switches 1 and 2 and of the switches 3 and 4 are connected in parallel between the negative terminal 5 of a supply source and one side of an inductance 7 the other side of which is connected to the positive terminal 6 of the supply source. The junctions of the switches 1, 2 on the one hand and 3, 4 on the other hand are connected to terminals 8, 9 via two primary windings 10, 11 of a line transformer 12, said windings having the same winding sense. The subscriber's loop is connected to the terminals 8 and 9. At the other end of the line, not shown in the figures, there is the subscriber's set, which comprises a ringing device the impedance of which is connected between the terminals of the subscriber's line when the receiver of the subscriber's set is on the hook. The speech signals which are supplied to the terminals 8 and 9 are taken from the ends 14, 15 of the secondary winding 13 of said transformer 12 and inverted, said ends 14, 15 being connected to a transmission path, not shown, in a telephone exchange.

The switches of the inverter are controlled so by means of a two-level signal S, that either the switches 1, 4 are closed simultaneously and the switches 2, 3 opened, or the switches 2, 3 are simultaneously closed and the switches 1, 4 opened. This action is obtained by controlling the switches 1 and 4 by means of the signal S and controlling the switches 2, 3 by means of the complementary signal $\overline{S}$. It is obvious that, depending on the value of the signal S, the current in the subscriber's set, connected between terminals 8, 9, flows in a first direction or in a direction opposite thereto. As described above, a known method for generating ringing signals with a frequency of 50 Hz uses a signal having a frequency of 50 Hz is as control signal S for the switches. Then, however, the above-mentioned drawbacks occur, which are caused by the high level of the odd harmonics of the 50 Hz frequency.

Because of the invention it is possible to obviate said drawback by using a pulse code modulated signal S for controlling the switches, which signal represents a modulated sinusoidal ringing signal having a frequency of 50 Hz and a sampling frequency which considerably exceeds 50 Hz. In FIG. 1 the signal S is generated by means of a pulse code signal generator 16 e.g. an analog to pulse code signal convertor. Such a convertor can e.g. be any prior art delta modulator or sigma delta modulator or a pulse-width modulator etc. A sinusoidal signal having a frequency of 50 Hz and applied to the input 17 is converted in e.g. the delta modulator 16 into said signal S by means of a sampling frequency F which is determined by the clock signal generator 18. The complementary signal $\overline{S}$ is obtained by means of the inverter 19. The signal S is a square-wave signal and has transitions whose instants are determined by the delta modulation and which can occur at time intervals which are a multiple of the cycle $T=1/F$.

If the switches are controlled by the signal S thus formed, it was ascertained at a sampling frequency F which is large relative to the 50 Hz frequency of the ringing signal (for example $F=15$ kHz), that at the terminals of the ringing device of the subscriber's set, located at the other end of the line, a signal having a frequency of 50 Hz is obtained which is attenuated to a very small degree only whereas all the higher harmonics of this signal, which are the result of the control of the switches, are markedly attenuated by a filter comprising the series inductance 7 and by the parallel line capacitance which in practice are connected in parallel with the impedance of the ringing device.

Compared with the known ringing signal generator control, in which the switches are controlled by square-wave signals of a frequency of 50 Hz and in which comparatively much energy is distributed over all the odd harmonics of said 50 Hz frequency, the use of e.g. the delta modulation for performing said control enables the distribution of the noise spectrum which is superimposed on the signal of 50 Hz frequency over a much wider frequency band, so that the noise spectrum is filtered by the inductance 7 and the line capacitance.

Finally it was ascertained that the resulting residual voltage of the 50 Hz signal superimposed on the filtered noise spectrum and induced in the secondary winding 13 at the ends 14, 15 of this secondary winding 13 is but weakly present; said residual voltage can, however, be limited by a limiter connected to said terminals 14, 15.

It is obvious that the control signal S, obtained by means of e.g. the delta modulator from a sinusoidal signal, need not of necessity be generated in this manner. Said signal S can also be obtained by other means. It is, for example, possible to use a store in which the signal S is stored, for example a ROM or a circulating store, in which the binary elements derived from e.g. the delta encoding of the sinusoidal ringing signal are stored in a cycle or half a cycle of said sinusoidal signal. So far the starting point was a ringing signal frequency of 50 Hz. It is, however, obvious that the device according to the invention can be used for generating ringing signals of other frequencies, for example of 25 Hz.

The switches 1, 2, 3 and 4 of the line current inverter can be implemented by means of semiconductor circuits. It is, for example, possible to use the device shown in FIG. 2, in which elements corresponding with the elements of FIG. 1 have been given the same reference numerals. The switch 1 (or 3) is implemented by means of two transistors $T_1$, $T_2$ (or $T_3$, $T_4$) which are connected in known manner in such a way that they constitute a high-gain complex transistor. The main current path of the transistor $T_1$ (or $T_3$) is provided between the inductance 7 and the winding 10 (or 11). The base electrode of the transistor $T_2$ (or $T_4$) is connected to the positive terminal 6 of the battery via the resistor 20 (or 21). The switch 1 (or 3) is connected to the switch 2 (or 4) via the separating diode 22 (or 23), which is also connected to the base electrode of the transistor $T_2$ (or $T_4$). The switch 2 (or 4) is implemented by means of a transistor $T_5$ (or $T_6$), the main current path of which is provided between the diode 22 (or 23) and the negative terminal 5 of the battery. The base electrode of the transistor $T_5$ is controlled by the signal S, whereas the base electrode of the transistor $T_6$ is controlled by the signal $\overline{S}$, these signals S and $\overline{S}$ being, for example, generated in the above-described manner and applied, after having been brought to a suitable d.c. voltage level, to the transistors in order to enable control of the transistors in the cut-off or saturation range. This circuit clearly shows that when signal S has a value which adjusts the transistor $T_5$ of the switch 2 to the saturation state, the two transistors $T_1$, $T_2$ of the switch 1 are blocked by the diode 22, whereas simultaneously the transistor $T_6$ of switch 4 is cut-off and the transistors $T_3$, $T_4$ of switch 3 are conductive so that the line current can flow from terminal 9 to terminal 8. If the transistor $T_6$ is adjusted to the saturation state by the signal $\overline{S}$ the action of the switches 1 and 2 is replaced by that of the switches 3 and 4 and the line current flows, from terminal 8, to terminal 9.

What is claimed is:

1. A ringing signal generator for use in a subscriber's line comprising pulse code signal generator means for providing a pulse code modulated signal corresponding to a sinusoidal ringing signal of a given frequency and having transitions at time intervals that are a multiple of the inverse of a sampling frequency that is substantially higher than said given frequency, switch means responsive to said pulse code modulated signal for reversing a supply current to said subscriber's line during transitions of said pulse code signal, and filter means comprising an inductance in series with said switch means for substantially attenuating those frequencies of the reversed supply current in the subscriber's line that are higher than said ringing signal frequency.

2. A ringing signal generator as claimed in claim 1 wherein said pulse code signal generator comprises an analog to pulse code signal convertor having applied thereto a sinusoidal ringing signal for producing said pulse code modulated signal.

3. A ringing signal generator as claimed in claim 2 wherein said analog to pulse code signal convertor comprises a delta modulator for converting said sinusoidal signal into a delta modulated signal.

4. A ringing signal generator as claimed in claim 1 wherein said ringing signal generator comprises a memory for storing said pulse code modulated signal.

* * * * *